United States Patent [19]

Baba et al.

[11] Patent Number: 4,904,388
[45] Date of Patent: Feb. 27, 1990

[54] PROCESS FOR SLUDGE THICKENING

[75] Inventors: Kenji Baba; Shoji Watanabe; Hayao Yahagi; Hitoshi Ogasawara, all of Hitachi, Japan

[73] Assignee: Hitachi, Ltd., Tokyo, Japan

[21] Appl. No.: 262,212

[22] Filed: Oct. 21, 1988

Related U.S. Application Data

[60] Continuation of Ser. No. 782,900, Oct. 2, 1985, abandoned, which is a division of Ser. No. 598,463, Apr. 9, 1985, abandoned, which is a continuation of Ser. No. 327,117, Dec. 3, 1981, abandoned.

[30] Foreign Application Priority Data

Dec. 5, 1980 [JP] Japan ............................... 55-172189
Dec. 5, 1980 [JP] Japan ............................... 55-172190

[51] Int. Cl.$^4$ ............................................. C02F 11/04
[52] U.S. Cl. ................... 210/605; 210/609; 210/614; 210/621; 210/630
[58] Field of Search ........ 210/603, 605, 609, 612–614, 210/620, 621, 630, 631, 194, 206

[56] References Cited

U.S. PATENT DOCUMENTS

| 4,062,770 | 12/1977 | Kneer | 210/614 X |
| 4,130,481 | 12/1978 | Chase et al. | 210/614 X |
| 4,192,740 | 3/1980 | Savard et al. | 210/614 |
| 4,352,738 | 10/1982 | Blay et al. | 210/614 X |
| 4,437,992 | 3/1984 | Saito et al. | 210/96.1 X |

Primary Examiner—Tom Wyse
Attorney, Agent, or Firm—Antonelli, Terry & Wands

[57] ABSTRACT

An apparatus for sludge thickening including a sludge thickener allowing suspended solids of sludge supplied thereto to settle by their own weight while being thickened. The sludge supplied to the sludge thickener is subjected to aeration for a predetermined period of time in a sludge aerator. Aeration of the sludge strips the anaerobic gas, which is attached to the suspended solids in the form of bubbles or dissolved in the sludge, to atmosphere. By aeration of the sludge before being fed to the sludge thickener, floating of the thickened sludge in the thickener can be avoided.

9 Claims, 6 Drawing Sheets

PROCESS FOR SLUDGE THICKENING

This application is a continuation of application Ser. No. 782,900, filed on Oct. 2, 1985, abandoned which is a division of application Ser. No. 598,463, filed Apr. 9, 1985, abandoned which is a Continuation Application of Ser. No. 327,117 filed Dec. 3, 1981, abandoned.

BACKGROUND OF THE INVENTION

1. Field of the Invention

This invention relates to apparatus for sludge concentration for obtaining thickening of sludge by gravity settling, and, more particularly to an apparatus for sludge thickening capable of preventing floating of the sludge when thickening thereof is carried out.

2. Description of the Prior Art

Sludge disposed of in a municipal sewage plant is first thickened in a thickener, then subjected to digestion treatment, and thereafter dewatered. Processes for obtaining thickening of sludge known in the art include a gravity thickening process, floatation thickening process, and centrifugation thickening process. Of these processes, the gravity thickening process relying on the weight of the suspended solids or the difference in density between the suspended solids and the liquid in which they are suspended is the most simple process. Thus, this process is used in almost all the municipal sewage plants. The gravity thickening process essentially has the problem that although sludge settles, it floats in actual practice. Floatation of the thickened sludge is caused by increased buoyancy of the suspended solid particles due to adhesion of minuscule bubbles thereto as a result of generation of anaerobic gases. Floatation of the thickened sludge adversely affects the result achieved by a waste water treatment process for treating supernatant and reduces the efficiency of a sludge treatment process for treating the sludge.

In order to solve the aforesaid problem, the following report has been made: "REPORTS ON EXPERIMENTS CONDUCTED ON GRAVITY THICKENING" by K. Terada et al., Proceeding of the 15th Annual Conference of Japan Sewage Works Association (Japanese), Tokyo, May, 1978. Published by: Shadan-Hojin (Corporate Juridical Person) Nihon-Gesuido-Kyokai (Japan Sewage Works Ass'n)

The description in the above noted report can be summarized as follows. In carrying out gravity thickening of sludge, it is possible to delay the time at which floatation is initiated by subjecting the sludge to aeration. More specifically, by subjecting the sludge to aeration for 30-60 minutes, the time for floatation to begin can be delayed by over 20 hours. The time during which sludge stays in a thickener is 8-20 hours, so that floating of the sludge can be effectively prevented.

In the above noted report there is no specific mention of any concrete device for carrying out aeration, although it is stated therein that aeration has the effect of avoiding floatation. Thus, it is difficult to carry out aeration for practical purposes. Even if aeration of the sludge is carried out in the thickener in accordance with the description in the report in the literature, it would be difficult to obtain uniform aeration or mixing of the sludge in the thickener due to a large volume thereof and it would be impossible to prevent floating of the sludge with a high degree of efficiency. Moreover, a thickener is essentially intended to obtain settling of the sludge that is placed therein in a stationary fashion. Therefore, if the sludge is subjected to aeration, the operation would naturally be performed in a batch treatment and the speed at which the sludge is treated would be reduced.

Thus, one would be faced with the problem that difficulties would be encountered in carrying out thickening of the sludge effectively on the basis of the description in the aforesaid report.

SUMMARY OF THE INVENTION

This invention has as its object the provision of an apparatus capable of carrying a gravity thickening process effectively into practice for obtaining sludge thickening.

One of the outstanding characteristics of the invention is that sludge is subjected to aeration in an aerator before being fed to a thickener, to thereby remove anaerobic gases dissolved into the sludge or anaerobic gases deposited on the suspended solids in the sludge in the form of minuscule bubbles, so that anaerobic gas free sludge can be fed to the thickener.

Another outstanding characteristic is that the flow rate of aeration gas can be controlled in accordance with the nature of the sludge.

Additional and other objects, features and advantages of the invention will be come apparent from the description set forth hereinafter when considered in conjunction with the accompanying drawings.

DESCRIPTION OF THE PREFERRED EMBODIMENTS

Figure 1:
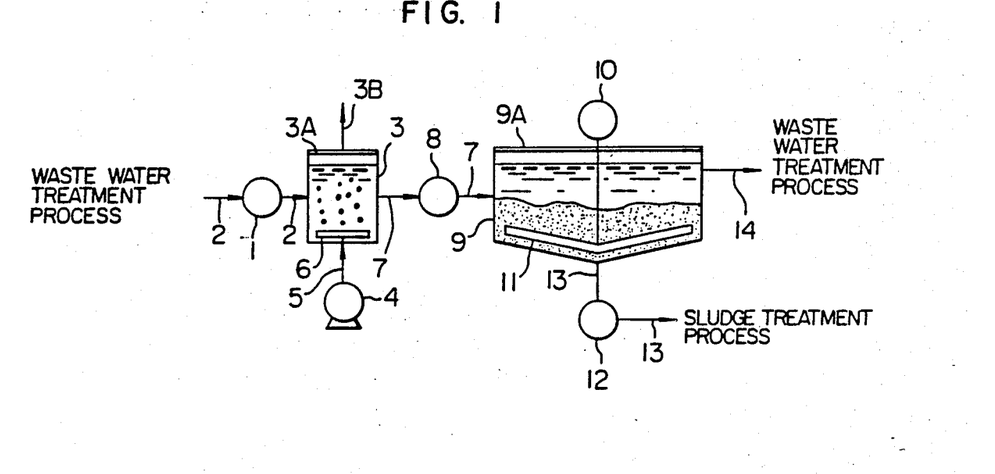
FIG. 1 is a schematic view of the apparatus for sludge thickening comprising one embodiment of the invention.

Referring now to the drawings wherein like reference numerals are used throughout the various views to designate like parts and, more particularly, to FIG. 1. According to this figure sludge produced in a waste water treatment process is fed to an aerator 3 by a sludge pump 1 via a sludge inlet line 2. Located at the bottom of the aerator 3 is a gas scattering device 6 to which aeration gas is supplied from a blower 4 via a gas supply line 5. Air that can be readily obtained may be used as aeration gas. The aeration gas drawn by suction into the aerator 3 forms bubbles which subject the sludge to air and also agitates same. Attached to the aerator 3 at its top is a lid 3A for avoiding scattering to outside of mist produced by aeration which has a gas exhaust line 3B extending therethrough for releasing aeration exhaust gas to atmosphere. In releasing the aeration exhaust gas to atmosphere, the aeration exhaust gas is preferably subjected to deodorization. The sludge subjected to aeration in the aerator 3 is fed to a thickener 9 via a sludge supply line 7 by gravity or by means of a sludge pump 8. In the sludge thickener 9 provided with a lid 9A for avoiding scattering of offensive smell, solids suspended in the sludge flowing into the thickener 9 settle by the difference in density between the solid particles and the liquid surrounding them. As a result, the suspended solids settle to the bottom as thickened sludge and the liquid containing almost no suspended solids is separated from the thickened sludge and lies thereabove to form supernatant. In this way, the sludge is separated into a solid phase and a liquid phase. The thickened sludge settled to the bottom of the thickener 9 is gathered together by a sludge rake 11 which is rotatably driven by a drive means 10. The thickened sludge thus gathered together is withdrawn by a sludge pump 12 and transferred via a sludge withdrawing line 13 to the next operation step (digestion treatment step, for example). The volume of the thickened sludge withdrawn through the sludge withdrawing line 13 from the thickener 9 is determined in such a manner that the sludge stays in the thickener 9 for a period of time long enough to obtain satisfactory thickening thereof. Usually withdrawing of the thickened sludge is carried out intermittently at a rate of once in several hours. Meanwhile the supernatant is returned to the waste water treatment process via a discharge line 14.

The mechanism for preventing the thickened sludge from floating by subjecting the sludge to aeration will now be described by referring to the results of experiments conducted on sludge aeration.

The reason why floatation of the sludge takes place in the thickener will be described.

Sludge produced in a waste water treatment process and introduced into a thickener contains a large number of microorganisms. Because of this, anaerobic microorganisms would have increased metabolism when the sludge in the thickener becomes anaerobic. Particularly the anaerobic microorganisms have increased metabolism at elevated temperature. As a result, methane, carbon dioxide, hydrogen sulfide, hydrogen, ammonia, nitrogen suboxide, nitrogen, etc., are generated. In this specification, metabolic products in the form of gases produced by increased metabolism of the anaerobic microorganisms will be hereinafter referred to as anaerobic gases.

Metabolic products of the anaerobic microorganisms are turned into minuscule bubbles of anaerobic gas in the sludge and adhere to the suspended solids in the sludge, so that the apparent density of the suspended solids becomes lower than that of the liquid in which the solids are suspended and the sludge becomes floating sludge. Investigation into the floating sludge carried out at a municipal sewage plant has revealed that innumerable minuscule bubbles adhere to the suspended solids in the floating sludge. Analysis of the composition of the gas in the upper portion of a thickener 9 has shown that it contains 0.13 vol % of methane, 0.34 vol % of carbon dioxide and small amounts of nitrogen suboxide and nitrogen. It has been observed that the phenomenon of floating of the sludge takes place vigorously in the summertime when the temperatures of water and air become high.

In the present invention, the sludge fed to the thickener 9 is subjected to aeration to thereby remove anaerobic gases dissolved therein or anaerobic gases in the form of minuscule bubbles adhering to the solids suspended in the liquid in the sludge. By subjecting the sludge to aeration, the minuscule bubbles adhering to the suspended solids of the sludge are stripped off the sudpended solids by agitation and absorbed by aeration gas bubbles, so that the minuscule bubbles can be removed from the sudpended solids.

Meanwhile the anaerobic gas dissolved in the liquid is absorbed by anaerobic gas bubbles. The process of removal of the dissolved anaerobic gases can be expressed by the following formulas:

$$T_g = V \cdot K_L a \cdot (C - C_s) \tag{1}$$

$$C_s = K_H \cdot P_c \tag{2}$$

where
$T_g$: transfer rate of anaerobic gas from a liquid phase to a gaseous phase (mol/h);
V: vessel volume (l);
$K_L a$: overall gas transfer coefficient (1/h);
C: concentration of anaerobic gas in liquid (mol/l);
$C_s$: saturated concentration of anaerobic gas in liquid (mol/l);
Pc: partial pressure of anaerobic gas in aeration gas (mmHg); and.
$K_H$: Henry's constant (mol/l/mmHg).

From formula (1), it will be seen that the transfer rate of the anaerobic gas from a liquid phase to a gaseous phase $T_g$ is proportional to the difference $(C - C_s)$ between the concentration of anaerobic gas in the liquid C and the saturated concentration of anaerobic gas in the liquid $C_s$. Also, the overall gas transfer coefficient $K_{La}$ increases as the volume of gas for aeration increases. Thus, by increasing the volume of gas used for aeration, the anaerobic gas transfer rate $T_g$ can be increased and the anaerobic gas can be removed efficiently. Preferably the gas used for aeration contains no anaerobic gas or very little anaerobic gas even if such is contained. From the standpoint of increasing the efficiency with which anaerobic gas removal is carried out, oxygen gas or argon gas is preferred. From the economical point of view, air is the most suitable gas. Air contains about 80% nitrogen, so that the nitrogen gas saturated concentration in the liquid in gas atmosphere of atmospheric pressure is about 12 ml/l. By using air as gas for performing aeration, 12 ml of nitrogen cannot be removed from 1 l of liquid, and thus removal of nitrogen gas from sludge would be considerably low in rate. However, aeration by means of air is able to remove all the carbon dioxide and methane that have a high partical pressure ratio of all the anaerobic gases.

Experiments to collect data for proving the validity of the above noted mechanism. For preventing floating of the sludge being thickened. The results of the experiments will now be discussed.

Samples of sludge fed to a thickener at a municipal sewage plant were collected and placed in two graduated cylinders. The sample or specimen in one graduated cylinder was allowed to stand for 24 hours and the sample or specimen in the other graduated cylinder was subjected to aeration for a period of 60 minutes with an air current of 0.5 l/min and then allowed to stand for 24 hours.

Figure 2:
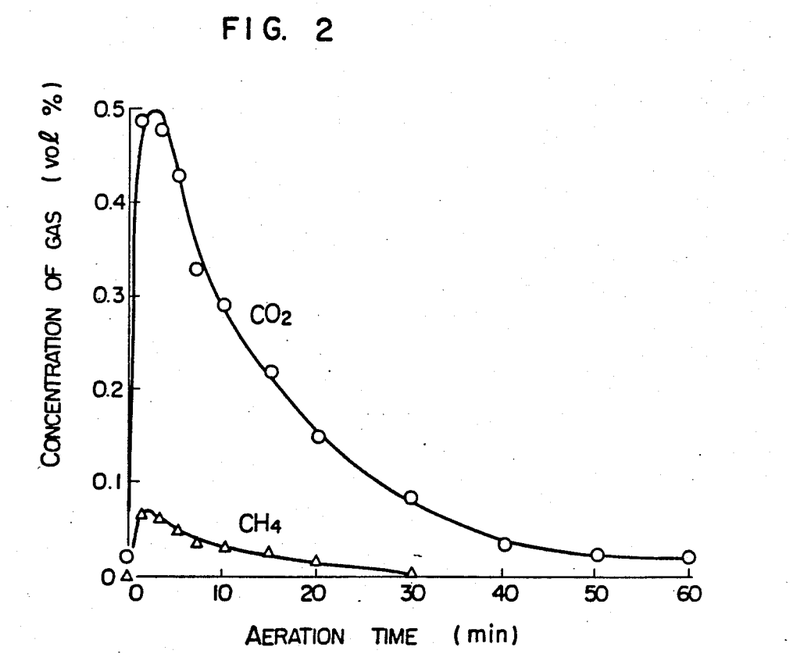
FIG. 2 is a graph showing the aeration time in relation to the concentration of gas which has been obtained in experiments.

The specimen placed in the latter cylinder had the concentrations of methane ($CH_4$) and carbon dioxide ($CO_2$) in the exhaust gas of aeration measured in chronological sequence when aeration was carried out. The results are shown in FIG. 2 in which it will be clearly seen that aeration enables the anaerobic gas in the sludge to be removed. Methane was removed in about 30 minutes and carbon dioxide in about 60 minutes.

Figure 3:
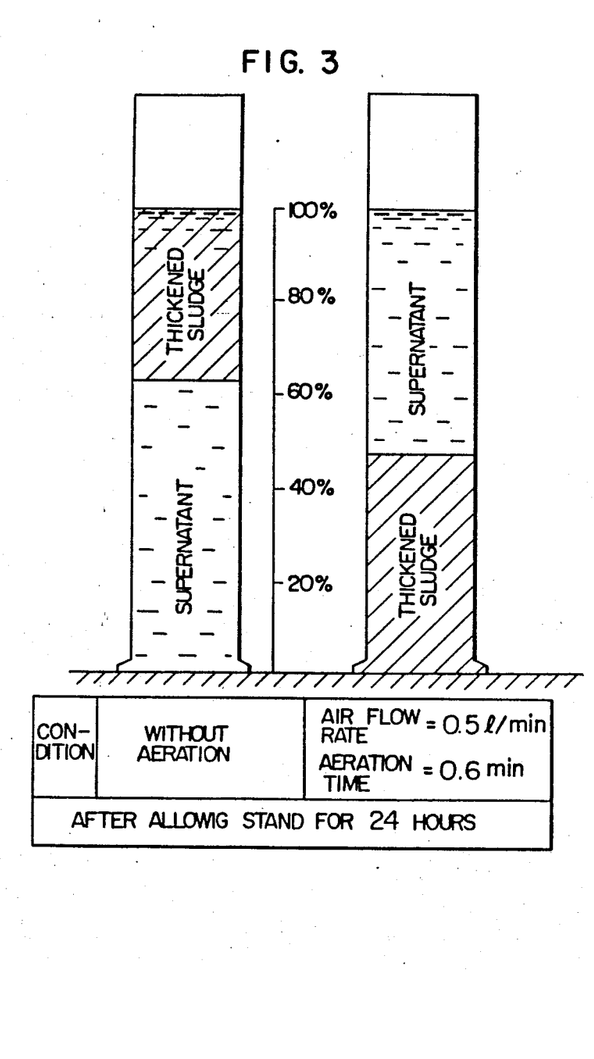
FIG. 3 is a graph showing the state of thickening of sludge which varies depending on whether the sludge is subjected to aeration or not.

The results of tests conducted after allowing the two specimens to stand for 24 hours are shown in FIG. 3. It will be clearly seen in FIG. 3 that the specimen of sludge not subjected to aeration floated after being thickened but the specimen of sludge subjected to aeration did not float upon being thickened and settled to the bottom in good condition after 24 hours. It has been ascertained by the results of tests that it is possible to remove anaerobic gases from the sludge by subjecting the latter to aeration, thereby enabling floating of the thickened sludge to be avoided.

Figure 4:
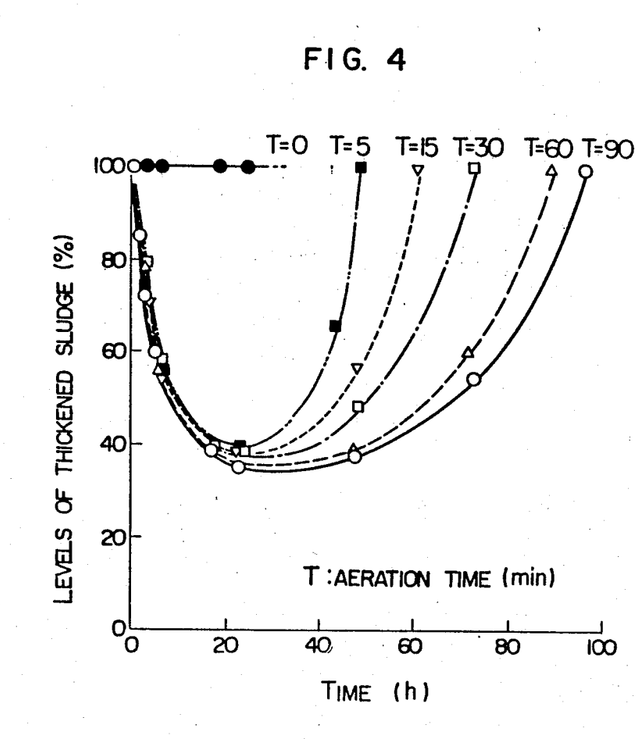
FIG. 4 is a graph showing changes in the level of sludge occurring in chronological sequence in relation to aeration time.

In order to check the relationship between the aeration time and the results achieved in preventing the floating of the sludge upon being thickened, further tests were conducted. More specifically, specimens of sludge were collected in six graduated cylinders of a volume of 1 l each and subjected to aeration for periods of 0, 5 min., 15 min., 30 min., 60 min. and 90 min, respectively, to measure the levels of the thickened sludge in chronological sequence. The results obtained are shown in FIG. 4 in which the levels of the thickened sludge are designated by % with the depth of water being taken as 100%. It will be seen that when aeration time was 0, the level of the thickened sludge showed no change and remained in 100% position, indicating that no settling of the thickened sludge occurred. Meanwhile the specimens that were subjected to aeration settled in good condition when thickened, irrespective of the aeration time involved. It was shown that floating of the thickened sludge could be prevented at least for over 40 hours. It was revealed that the longer the aeration time, the longer was the time that elapsed before the thickened sludge floated.

Figure 5:
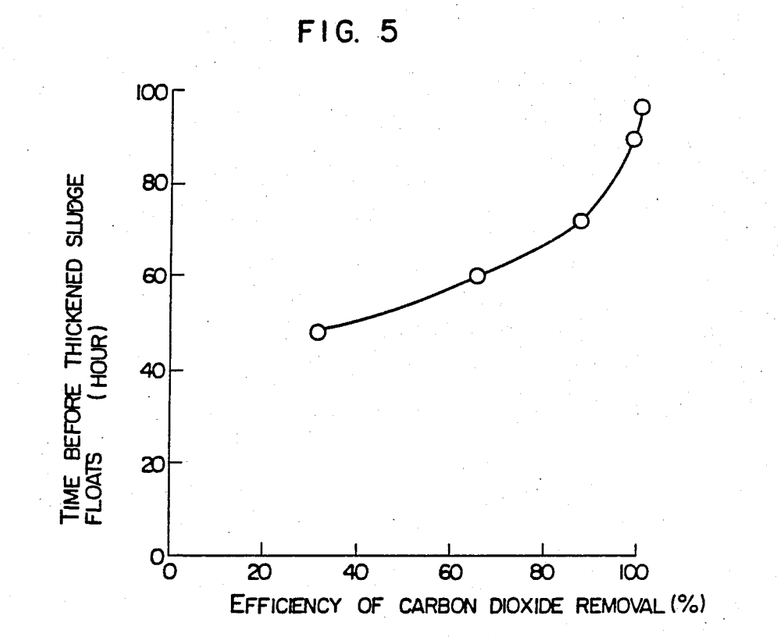
FIG. 5 is a graph showing the relation between removal efficiency of carbon dioxide and the time elapsing before thickened sludge floats.

The fact that prolongation of the aeration time results in a prolongation of the time that elapses before the thickened sludge floats would be accounted for by an increase in the amount of anaerobic gases removed from the sludge. To prove this hypothesis, tests were conducted on the relationship between the rate of removal of carbon dioxide which is one of the anaerobic gases and the floating of the settled thickened sludge. FIG. 5 shows a characteristic that was obtained in the tests. In FIG. 5, it will be seen that the higher the rate of removal of carbon dioxide, the longer is the time that elapses before the settled thickened sludge floats.

The results of the experiments conducted show that it is possible to prevent floating of the thickened sludge by subjecting sludge to aeration. As can be clearly seen in FIG. 4, it will be seen that when the sludge is aerated for only 5 min., the thickened sludge remains settled for over 20 hours. The sludge in the thickener 9 is withdrawn therefrom after the former has stayed therein for a predetermined time (8-20 hours), and withdrawing is usually carried out intermittently for several times in a day. Thus, by aerating the sludge while it is in the aerator 3, it is possible to positively avoid floating of the thickened sludge in the thickener 9.

Another advantage offered by the provision of the aerator 3 is that removal of anaerobic gases can be carried out uniformly. More specifically, the time during which the sludge stays in the aerator 3 has only to be about five min. and the aerator 3 has only to have a small volume. For example, the aerator 3 may be about 1-2% of the thickener 9 in volume. By carrying out uniform removal of anaerobic gases from the sludge in the aerator 3, all the suspended solids in the sludge in the thickener 9 settle when they are thickened, thereby improving the efficiency with which the thickened sludge settles.

Figure 6:
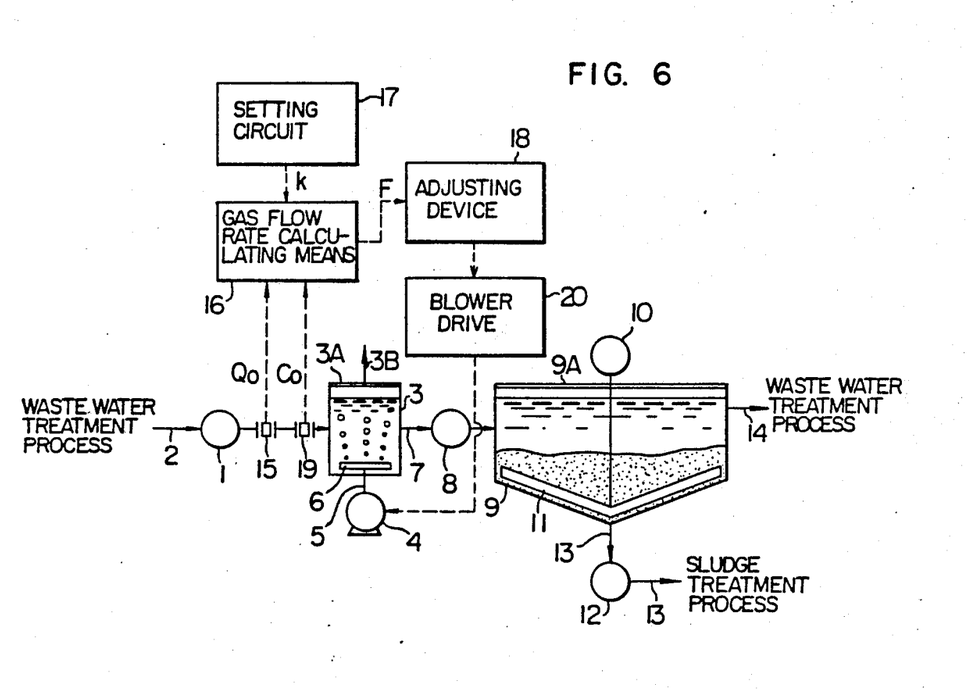
FIG. 6 is a schematic view of the apparatus for sludge thickening comprising another embodiment of the invention.

As shown in FIG. 6 a flow meter 15 and a densitometer 19 are provided for measuring the flow rate $Q_2$ and the concentration $C_o$, respectively, of sludge supplied to the aerator 3 by the sludge pump 1. The sludge flow rate $Q_2$ and sludge concentration $C_o$, measured by the two meters 15, 19 are supplied to a gas flow rate calculating means 16 to which is supplied a constant k from a setting circuit 17 for converting the values of the sludge flow rate $Q_2$ and sludge concentration $C_o$ to a required gas flow rate. The gas flow rate calculating means 16 does calculation on the following formula and produces an aeration gas flow rate command F:

$$F = K Q_2 C_o \qquad (3)$$

An adjusting device 18 controls a blower drive 20 in accordance with the aeration gas flow rate command F, to vary the number of revolutions of the blower 4. When the flow rate of the solids in the sludge that is represented by the product of the sludge flow rate $Q_2$ and the sludge concentration $C_o$ increases, the aeration gas flow rate is increased.

By controlling the aeration gas flow rate in accordance with the flow rate of solids in the sludge, it is possible to carry out stripping of anaerobic gases from the sludge in a short period of time. This enables sludge treatment to be carried out stably without regard to changes in the nature of the sludge.

Control of the aeration gas flow rate can be effected in such a manner that it can be used for practical purposes, although the precision with which control is effected is slightly reduced, when the sludge flow rate $Q_2$ alone is measured and no sludge concentration $C_o$ is measured. This offers the advantage that the adjusting device can be dispensed with. The reason why control of the aeration gas flow rate can be effected by measuring the sludge flow rate $Q_2$ alone will be discussed on the basis of the results of experiments conducted by us.

Figure 7:
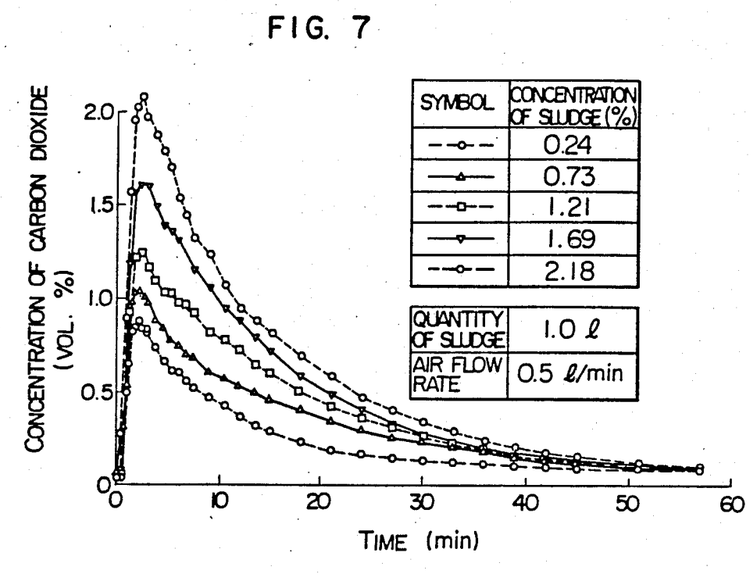
FIG. 7 is a graph showing the relation between the concentration of carbon dioxide and the thickening of sludge.

Experiments on the stripping of carbon dioxide were conducted in order to check the influences that might be exerted by sludge concentration on the stripping of anaerobic gases when aeration is carried out. Specimens of sludge of 1 l each, having sludge concentrations of 0.24%, 0.73%, 1.21%, 1.69% and 2.1%, respectively, were aerated with an aeration gas flow rate of 0.5 l/min, and changes occurring in chronological sequence of the concentration of carbon dioxide in the exhaust gas were measured. FIG. 7 shows the results of the experiments in which it will be seen that the higher the concentration of the sludge, the greater is the amount of the stripped carbon dioxide and the longer is the time required for carrying out stripping. When the sludge has a higher concentration, decomposition of organic matter by the action of anaerobic microorganisms takes place vigorously, thereby increasing the production rate of carbon dioxide. In FIG. 7, it will be seen that when aeration is carried out with a constant gas flow rate, the amount of carbon dioxide stripped off undergoes a variation depending on the concentration of the sludge and the time required for stripping increases as the concentration of the sludge increases.

Figure 8:
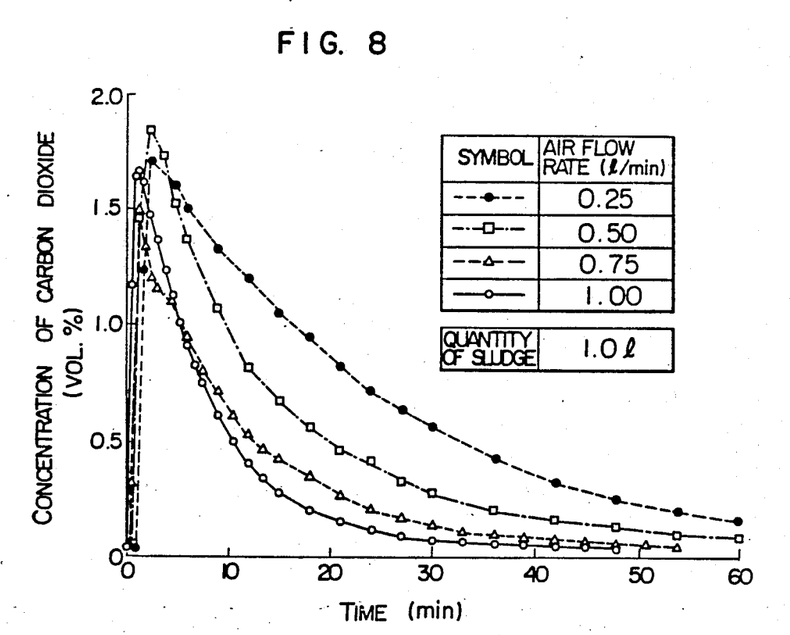
FIG. 8 is a graph showing the relation between the flow rate of air for aeration and the concentration of carbon dioxide.

FIG. 8 shows the results of tests conducted to quantitatively determine the influences that might be exerted by the flow rate of aeration gas on the settling of the sludge to the bottom of the thickener. Specimens of sludge were collected in four graduated cylinders of a capacity of 1 l each and subjected to aeration with aeration gas flow rates of 0.25 l/min, 0.50 l/min, 0.75 l/min and 1.00 l/min, respectively, to measure changes occurring in chronological sequence in the concentration of carbon dioxide in the aeration exhaust gas. In FIG. 8, it will be seen that the higher the aeration gas flow rate, the higher becomes the rate at which the concentration of carbon dioxide is reduced or the rate at which carbon dioxide is stripped off the sludge.

As can be clearly seen in FIGS. 7 and 8, it is possible to vary the rate at which the carbon dioxide in the sludge is removed therefrom by controlling the flow rate of aeration gas depending on the amount of the solids in the sludge or the amount of the carbon dioxide generated. Thus, the invention enables carbon dioxide to be smoothly removed even if the amount of solids in the sludge is very large. This means that it would be possible to avoid floating of the thickened sludge in the thickener 9 merely by controlling the flow rate of aeration gas in the aerator 3 even if the sludge fed to the aerator 3 varies in nature each time it is fed thereto.

In the embodiment shown in FIG. 6, the sludge fed to the aerator 3 has been described as having its flow rate and concentration measured. In some municipal sewage parts, the sludge fed thereto may be kept at a constant flow rate for a constant concentration. In this case, it would be evident that there would be no need to measure the flow rate and concentration of the sludge.

Figure 9:
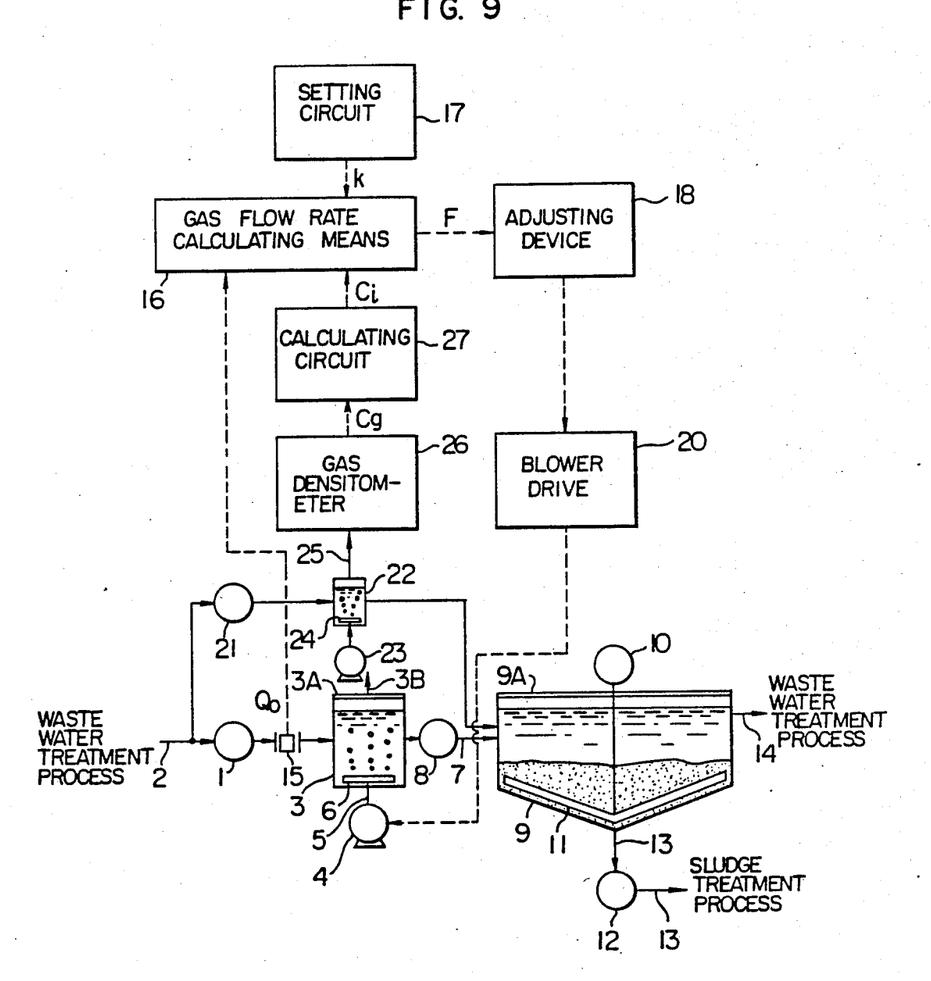
FIGS. 9–11 are schematic views of other embodiments of the invention.

FIG. 9 shows an embodiment of the invention in which the amount of the anaerobic gas contained in the sludge is directly measured to thereby control the flow rate of aeration gas.

In FIG. 9, sampling of the sludge fed from a waste water treatment process is carried out by means of a sludge pump 21 and the specimens are supplied to a testing aerator 22. Sampling may be carried out once in 1-2 hours because no sudden changes in the nature of the supplied sludge occur. A gas scattering device 24 is located in the lower portion of the testing aerator 22 and receives a supply of aeration gas from a blower 24. Aeration of the specimens collected by sampling is carried out in the testing aerator 22 for a predetermined period of time with a constant flow rate of aeration gas. The specimens subjected to aeration for a predetermined period of time are fed to the sludge thickener 9. Meanwhile aeration exhaust gas is led through an exhaust line 25 to a gas densitometer 26 to determine the concentration of any one of the gases of methane, carbon dioxide, nitrogen suboxide and nitrogen. The anaerobic gas that is detected may be any gas that is released from the sludge. However, carbon dioxide is particularly desired to be measured upon detection because it offers the advantage that it serves as a useful index for detecting the sludge that has become anaerobic for reasons that it is released in relatively large amounts from the sludge, it can be readily detected as by an infrared analyzer and it is produced at earlier stages of development of an anaerobic digestion reaction than methane. When the gas measured is methane, a semiconductor detector, such as a combustible gas detector, may be used, so that the gas densitometer 26 can have its cost reduced.

The gas concentration $C_g$ measured by the gas densitometer 26 is supplied to a gas volume calculating circuit 27 which is operative to determine the anaerobic gas volume $C_i$ contained in a unit sludge volume by obtaining the product of the gas concentration $C_g$ and an aeration time $T_s$ at the testing aerator 22, in accordance with the following formula:

$$C_i = \frac{Q_g}{V_s} \int_0^{T_s} C_g(t)dt \qquad (4)$$

where
$Q_g$: aeration gas flow rate by blower 23; and
$V_s$: sludge volume in testing aerator 22. The anaerobic gas volume $C_i$ obtained by formula (4) is supplied to the flow rate calculating means 16 which produces an aeration flow rate command F in accordance with formula (3) as described by referring to FIG. 6.

As described hereinabove, the aeration gas flow rate is controlled in accordance with the anaerobic gas volume in the embodiment shown in FIG. 9 too, so that treatment of sludge can be carried out efficiently. Because of the fact that the anaerobic gas volume is directly measured in the embodiment shown in FIG. 9, the embodiment offers the added advantage that control of the aeration gas flow rate can be effected with high accuracy.

Figure 10:
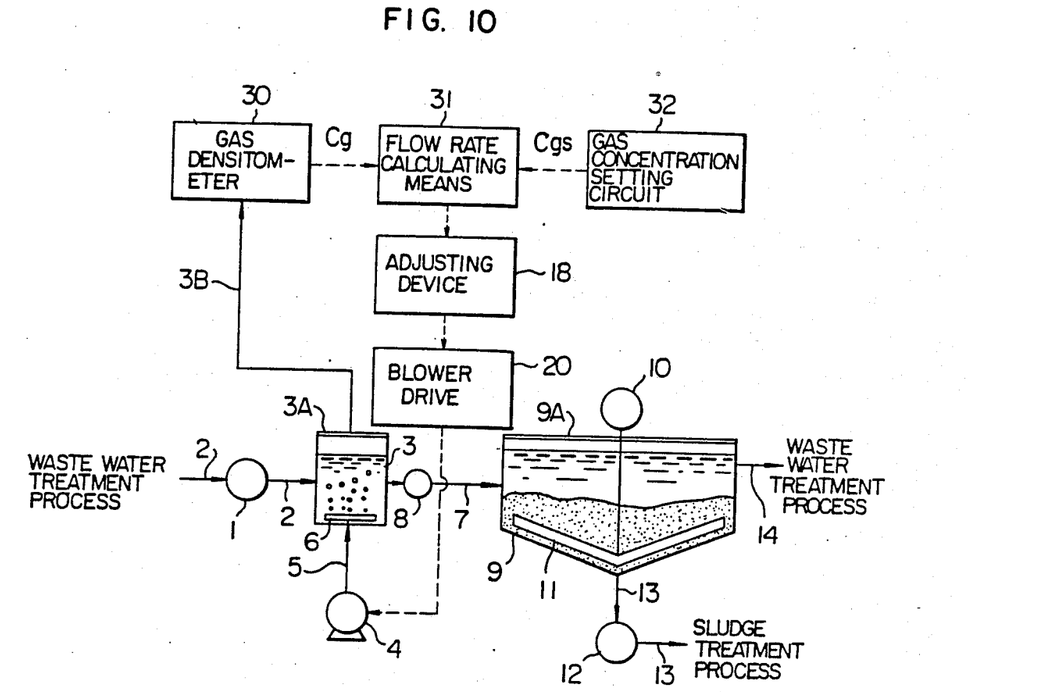

FIG. 10 shows a further embodiment in which control is effected in such a manner that the concentration of the anaerobic gas produced in the sludge aerator 3 reaches a target value.

In FIG. 10, the anaerobic gas generated in the sludge aerator 3 has its concentration measured by a gas densitometer 30. A flow rate calculating means 31 has inputted thereto a value $C_g$ obtained by the gas densitometer 3 and a target value $C_{gs}$ supplied from a gas concentration setting circuit 32 and produces a flow rate command signal F in accordance with the following formula:

$$F = k(C_g - C_{gs}) \qquad (5)$$

where
k: constant.

The target value $C_{gs}$ is set in such a manner that when carbon dioxide is selected as the gas of interest, its concentration has the value of 0.3 vol % as shown in FIG. 7. Thus when there is a difference between the value $C_g$ obtained by measuring and the target value $C_{gs}$, the blower 4 is continuously controlled. In the embodiment shown in FIG. 10, the anaerobic gas volume contained in the sludge is determined or the actual anaerobic condition of the sludge is determined. Thus, the embodiment of FIG. 10 offers the advantage that, even if the nature of the sludge may vary depending on the season, stripping of the anaerobic gas can be effected satisfactorily.

Embodiments of the invention in which the aeration gas flow rate is controlled in accordance with the amount of the anaerobic gas contained in the sludge have been described. It will be appreciated that the embodiments allow the anaerobic gas in the sludge to be readily removed therefrom at a high rate, so that treatment of the sludge can be carried out stably because floating of the thickened sludge can be positively avoided even if the anaerobic condition of the sludge may vary depending on season.

In the embodiments shown in FIGS. 6, 9 and 10, control of the aeration gas flow rate is carried out by varying the number of revolution of the blower 4. However, an adjusting valve may be mounted between the blower 4 and the gas scattering device 6 so as to vary the aeration gas flow rate by adjusting the angle of the valve.

When air is used as aeration gas, the components of air, such as nitrogen and oxygen, would have their concentrations varied by the release of the anaerobic gas from the sludge. Thus, determinations of a gas could be carried out by measuring the concentration of a certain component of the aeratio gas.

In the embodiments shown and described hereinabove, the sludge aerator 3 is located outside the sludge thickener 9. However, the sludge aerator 3 may be located inside the sludge thickener 9 as shown in FIG. 11.

Figure 11:
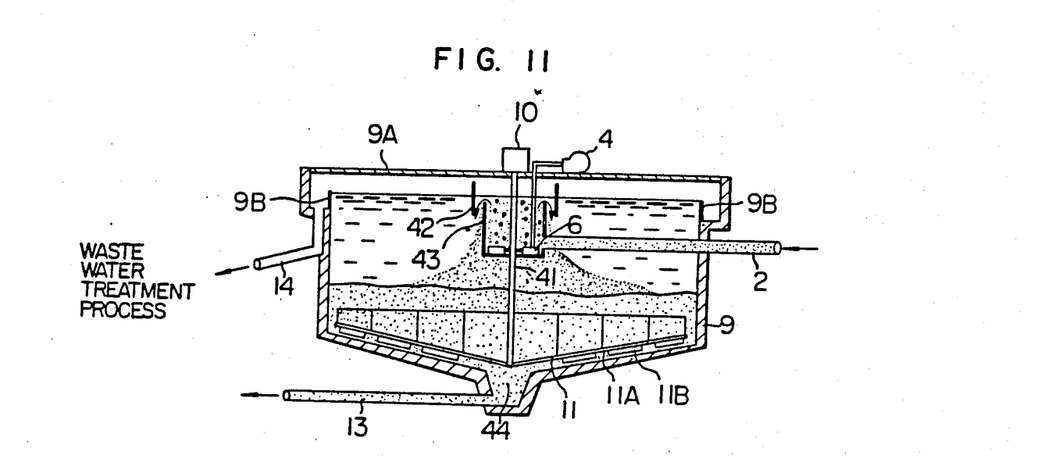

Referring to FIG. 11, a rotary shaft 41 is mounted in the central portion of the thickener 9 and driven for rotation by the drive means 10, such as an electric motor, and has secured to its lower end the sludge rake 11 including an arm 11A and a plurality of gathering plates 11B connected to the arm 11A. A cylindrical center well 42 is arranged in the upper portion of a liquid phase of the thickener 9 and attached to an aerator 43. The details of mounting of the center well 42 at the aerator 43 will be omitted, both in description and the drawing. The aerator 43 of the cylindrical shape having a closed bottom is arranged in the center well 42 and has the sludge inlet line 7 connected to the lower portion of its side. The gas scattering device 6 is located on the bottom of the aerator 43 and has aeration gas supplied from the blower 4. The aerator 43 is formed at its bottom with an opening for the shaft 41 to extend therethrough, although not shown.

In the aforesaid construction, sludge introduced through the sludge inlet line 7 into the sludge aerator 43 is aerated and agitated by gas, such as air, blown into the aerator 43 from the gas scattering device 6, and overflow of the sludge takes place at the upper end of the cylindrical aerator 43. The overflowed sludge passes between the aerator 43 and center well 42 as indicated by arrows and settles in the thickener 9. At this time, the center well 42 performs the functions of preventing the sludge from flowing along the liquid surface and directly overflowing the thickener 9 to be discharged through the outlet line 14 and at the same time causing uniform settling of the sludge to take place within the thickener 9. The sludge that has settled to the bottom of the thickener 9 is directed to a sludge outlet port 44 by the sludge rake 11, to be withdrawn from the thickener 9 via the sludge withdrawing line 13. Meanwhile supernatant overflows a side wall 9B of the thickener 9, and discharged through the discharge line 14. The thickener 9 is circular in shape as viewed from above and the side wall 9B is formed with a multiplicity of cutouts to enable the supernatant to flow therethrough in overflowing the side wall 9B.

By providing the aerator 43 inside of the thickener 9, it is possible to avoid floating of the thickened sludge.

The invention can be readily worked in this embodiment, because the construction is simple and only requires the positioning of an aerator 43 in the thickener 9 that is already built.

From the foregoing description, it will be appreciated that according to the invention the sludge is subjected to uniform aeration in the sludge aerator before being fed to the sludge thickener, so that removal of the anaerobic gas from the sludge can be carried out uniformly and the efficiency with which the sludge settles as it is thickened can be greatly increased.

Also, according to the invention, the aeration gas flow rate is controlled in accordance with the nature of the sludge or the volume of the anaerobic gas in the sludge, so that it is possible to remove the anaerobic gas from the sludge efficiently in a short period of time. Thus the invention makes it possible to carry out sludge treatment stably by positively avoiding floating of the thickened sludge, without being influenced by seasonal changes of the sludge condition.

What is claim is:

1. A process for sludge thickening, the processing comprising: allowing suspended solids of a sludge supplied to a gravity settling type sludge thickener to settle by their own weight while being thickened; subjecting the sludge to be supplied to the sludge thickener to aeration in a sludge aerator means; retaining the sludge in the sludge aerator means for less than one hour for stripping gas bubbles on surfaces around and interiorly of the sludge particles and dissolved gas in a mixed liquour containing sludge particles to the atmosphere without biological decomposition of organic materials contained in the sludge.

2. A process according to claim 1, further comprising the step of disposing the sludge aerator within the sludge thickener.

3. A process of sludge thickening, the process comprising the steps of: allowing suspended solids of sludge supplied to a gravity settling type sludge thickener to settle by their own weight while being thickened; subjecting the sludge to be supplied to the sludge thickener to aeration in a sludge aerator means; retaining the sludge in the sludge aerator means for less than one hour for stripping gas bubbles on surfaces around the interiorly of the sludge particles and dissolved gas in a mixed liquour containing sludge particles to the atmosphere without biological decomposition of organic materials contained in the sludge; sensing anaerobic conditions of the sludge admitted to the sludge aerator means by an anaerobic condition sensing means; and controlling the aeration gas flow rate in accordance with the anaerobic conditions sensed by the anaerobic condition sensing means.

4. A process according to claim 3, wherein the step of sensing includes detecting a concentration of anaerobic gas released from the sludge aerator means.

5. A process according to claim 4, wherein the step of detecting the concentration of the anaerobic gas includes detecting the gas released from a sensing aerator receiving a supply of a part of the sludge flowing into the sludge aerator means.

6. A process according to claim 4, wherein the step of detecting the concentration of anaerobic gas includes detecting the concentration of carbon dioxide.

7. A process according to claim 4, wherein the step of detecting includes detecting a concentration of methane.

8. A process according to claim 3, wherein the step of sensing includes detecting a concentration of an aeration gas component supplied to the sludge aerator means.

9. A process for sludge thickening, the process comprising the steps of: allowing suspended solids of sludge supplied to a gravity settling type sludge thickener to settle by their own weight while being thickened; subjecting the sludge to be supplied to the sludge thickener to aeration in a sludge aerator means; retaining the sludge in the sludge aerator means for less than one hour for stripping gas bubbles on surfaces around and interiorly of the sludge particles and dissolved gas in a mixed liquour containing sludge particles to the atmosphere without biologically decomposition of organic materials contained in the sludge; sensing a flow rate of the sludge flowing into the sludge aerator means by a flow rate sensing means; and controlling an aeration gas flow rate supplied to the sludge aerator means in accordance with the sludge flow rate sensed by the flow rate sensing means.

* * * * *